United States Patent [19] [11] 3,888,014
Bixler [45] June 10, 1975

[54] BELT MEASURING DEVICE

[75] Inventor: William L. Bixler, Littleton, Colo.

[73] Assignee: The Gates Rubber Company, Denver, Colo.

[22] Filed: Mar. 25, 1974

[21] Appl. No.: 454,995

[52] U.S. Cl. .............................. 33/174 R; 33/143 R
[51] Int. Cl. ........................ G01b 3/00; G01d 21/02
[58] Field of Search .......... 33/125 R, 143 E, 143 R, 33/143 H, 143 M, 143 J, 174 G, 148 G, 168 R, 174 R

[56] References Cited
UNITED STATES PATENTS
1,803,284  4/1931  Parkhurst et al. ................. 33/148 G
2,241,979  5/1941  Case .................................... 33/125 r Primary Examiner—Richard E. Aegerter
Assistant Examiner—L. Footland
Attorney, Agent, or Firm—H. W. Oberg, Jr.; Raymond Fink; Curtis H. Castleman, Jr.

[57] ABSTRACT

A device for establishing an outside circumference identification for V-belts. The device includes two generally semi-V-pulleys reciprocally separable from each other along the stick which has its length divided into at least one scale. Variable arcuate step references on at least one of the semi-pulleys provides means for gauging top widths within acceptable tolerances, for a plurality of V-belts. A pointing means in cooperation with the variable reference identify belts of a category.

6 Claims, 3 Drawing Figures

PATENTED JUN 10 1975

3,888,014

BELT MEASURING DEVICE

BACKGROUND OF THE INVENTION

The invention relates to geometrical instruments for measuring flexible bands, but more particularly, the invention relates to a device for measuring the pitch circumference and top width of V-belts within classes of acceptable wear and manufacturing tolerances.

Power transmission belts or V-belts are dimensionally classified according to top width, pitch circumference, and angle. For example, most automotive belts fit a 36° nominal angle sheave and have a standard top width of essentially ⅜ in. (9.5 mm), 7/16 in. (11 mm) or ½ in. (12.5 mm). Truck belts may also fit a 36° nominal angle sheave and have standard top widths of 11/16 in. (16 mm), ¾ in. (19 mm) or ⅞ in. (22 mm). Belts of different top widths usually have different nominal thicknesses. Nominal thickness for belts of standard top widths typically varies between belt manufacturers and worn belts usually have a variation in top widths resulting from the sides of the belts being worn away. New belts typically ride within a pulley or sheave in conformance with tolerances established by the Rubber Manufacturers Association. The tolerances generally establish the relative position where a belt will ride in a nominal sheave. For automotive applications, the nominal sheave diameter is 6 inches whereas for truck application the nominal diameter is 9 inches. The dimension which controls a V-belt position in a sheave is belt width. Belts of various thicknesses may ride at substantially the same place in a given sheave if they have the same nominal top width.

When old or worn belts are to be replaced, it is common practice to look in a catalog to find a suggested replacement belt for a given application. It is often expedient to avoid the use of the catalog and measure the belt with a device to find a corresponding replacement belt. The problem associated with measuring worn belts and belts of different manufacturers is that of identifying the proper top width category.

Belt measuring devices generally divide the belt circumference into semi-circular arcs of a known length and straight sections of determinable length. As belts of different top width categories generally have different thicknesses, some devices have a top width type scale pointer that is movable in response to the belt thicknesses. Such a device is disclosed by U.S. Pat. No. 2,336,594 as issued to Burkhard. Other devices compensate for belt thickness variations by providing two sheave halves that are divided into a plurality of semi-circular arcs.

Another type of device for directly establishing belt top width is disclosed in U.S. Pat. No. 3,696,511 as issued to Bixler et al. After an inverted belt is divided into arcs and straight sections, a circumference is read from a scale that is divided into standard units of lengths, or correspond to a belt product number.

The reference means on such devices for scaling belt widths are a fixed or constant dimension. Manufacturing tolerances and variations between individual manufacturers dimensions are not considered. Although the available belt measuring devices give a good measurement for some belts, they do not consider the variations in belt top width that are attributable to variations in manufacturing design, and dimension variations for different degrees of belt wear.

SUMMARY OF THE INVENTION

In accordance with the invention, a belt measuring device is provided which includes two oppositely oriented, semi-cylindrical, V-groove sheave members that are reciprocally separable along a calibrated stick. The semi-sheave members and stick provide a means for dividing a V-belt into generally semi-circular arcs of known length and straight portions of the determinable length. One of the semi-sheave members has a portion of at least one face that is divided into reference sections of at least one variable arcuate portion having generally a constantly variable radius which resemble a spiral of Archimedes. The spiral effects a generally constant change in the V-groove width for each reference section. Each spiral is chosen to reflect tolerance variations for belt manufacturers and belt wear. The arcuate portions provide a variable gauge for measuring belt widths within acceptable tolerances. A scale or a plurality of belt identification integers are provided along the stick for each of the plurality of variable arcuate portions. Belt circumference or a character code for identifying a particular group of belts is read directly on the stick.

Accordingly, an object to the invention is to provide a device for identifying categories of belts and measuring their lengths while minimizing the probability of including the measured belt in the wrong class.

Another object of the invention is to provide a variable reference means for determining belt categories. The variable reference advantageously provides a scale from which a group of belts may be accurately judged by visual or touch comparisons.

These and other objects or advantages of the invention will become apparent by reviewing the drawings and description thereof wherein.

Figure 1:
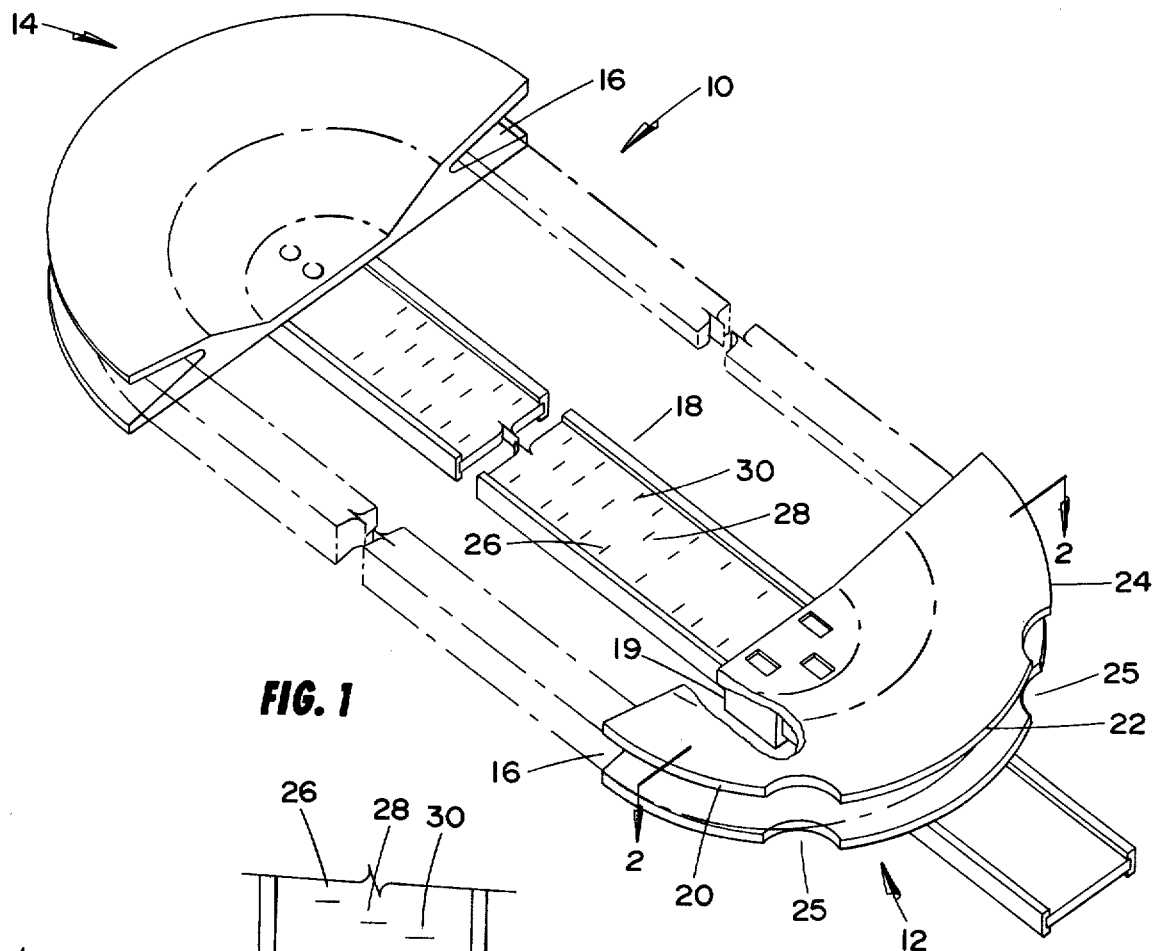
FIG. 1 is a broken isometric view of a preferred embodiment of the invention.
Figure 3:
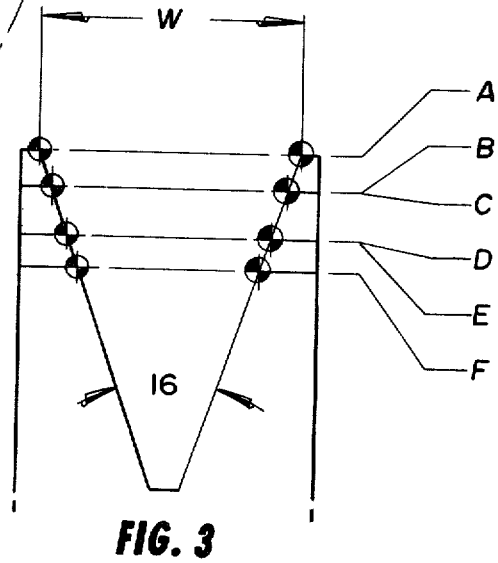

FIG. 3 combines a plurality of views taken along the radial portions of a, b, c, d, e and f of FIG. 1 showing the relative variations between the calibrated widths of the variable arcuate reference portions.

DESCRIPTION OF PREFERRED EMBODIMENT

Referring to the drawings, a V-belt measuring gauge 10 is provided in accordance with the invention that includes first 12 and second 14 generally semi-sheave members that are oppositely oriented in relation to each other. The semi-sheaves have predetermined radii and a V-groove 16 of a predetermined angle. Each semi-sheave is adapted to receive a curved portion of an upright V-belt shown in phantom. One of the sheave members 14 is rigidly attached to near one end of a stick 18 while the other oppositely facing away sheave member 12 is attached 19 to reciprocally move along the stick. At least one of the oppositely oriented faces defining the V-groove is provided with at least one or more variable arcuate reference portions 20, 22, 24 as a means for gauging and categorizing the top width of a variety of V-belts.

Figure 2:
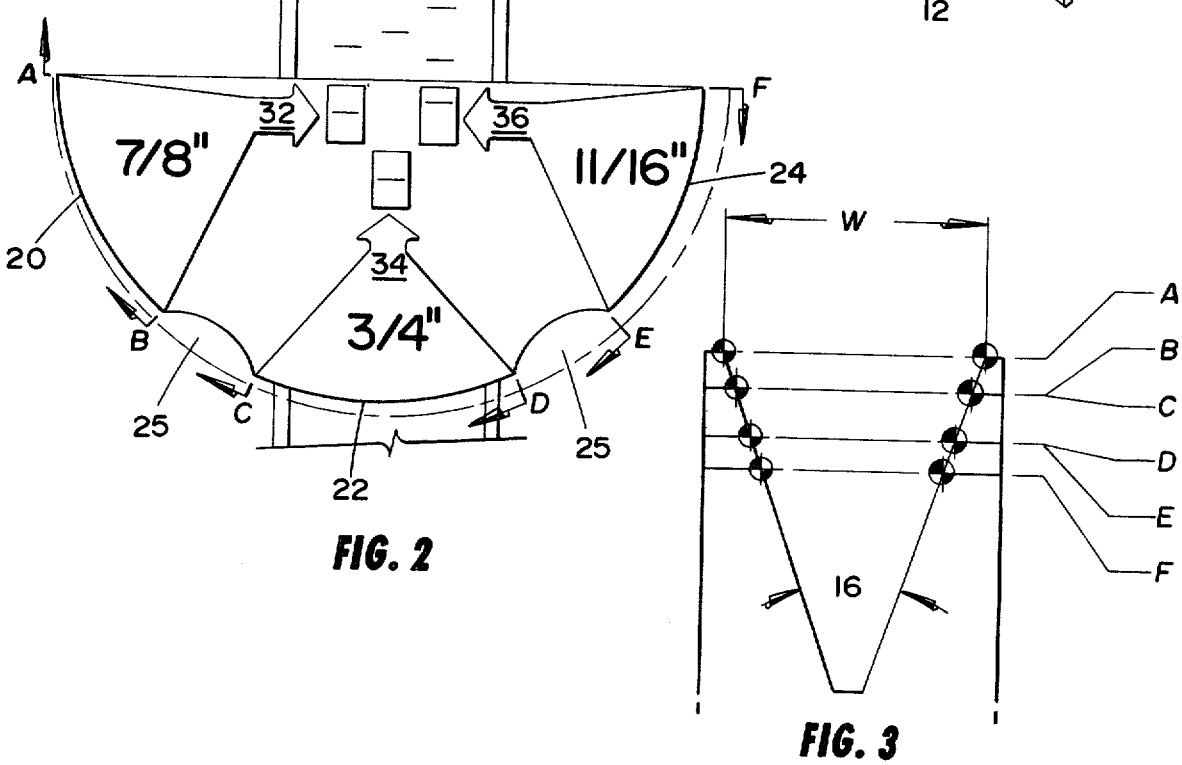
FIG. 2 is a view taken along the lines 2—2 of FIG. 1.

One face of the sheave is shaped to have groups of generally constantly variable radii A-B, C-D, E-F much like that of a spiral of Archimedes. The change in radius provides a correspondingly continuously variable V-groove width W for each reference portion. The change in radius is discernible in FIG. 2 where the phantom line denotes a fixed radius for illustration purposes. The change in radii corresponds to acceptable belt manufacturing tolerances, tolerances between belt manufacturers, and tolerances for worn belts. The variable arcuate portions 20, 22, 24 define data surfaces from which a nominal width of a V-belt can be determined.

The arcuate portions may be one continuous spiral that is divided into reference arcs by means of reference marks or spaces 25. Alternately, the arcuate portion may be one or several spirals that are arcuately separated by means of notches or projections. Although the arcuate portion need be provided on only one of the semi-sheave faces, it is preferred that the juxtaposed oppositely facing face of the sheave have the same arcuate contour. This insures an easier-to-read gauging portion that is positioned essentially transversely of the sheave member.

For example, a first arcuate reference portion has face radii that varies between 4.5 A and 4.37 B inches; a second arcuate reference portion that has face radii varying between 4.37 C and 4.24 D inches; and a third arcuate reference portion with face radii between 4.24 E and 4.12 F inches. A substantially uniform radius change is provided for each arcuate portion 20, 22, 24 to provide generally continuously variable widths W along the V-groove 16 of the sheave member. The first arcuate reference corresponds to a nominal top width W category of ⅞ in. and V-groove 16 angle of 38° but has actual width W dimensions of 0.781 B to 0.869 A inches; the second arcuate reference 22 is for a nominal top width w of ¾ in. and has an actual range of 0.692 D to 0.781 C inches; and the third arcuate reference 24 corresponds to a 11/16 in. nominal top width W with dimensions ranging between 0.608 F and 0.692 E in.

The corresponding top width variations are shown schematically in FIG. 3 where the arcuate references are superimposed in a radial plane to show maximum and minimum tolerances for the three top width W categories of the Example. Any number of variable arcuate reference portions having different top width ranges may be additional and addtional variable arcuate portions may be provided along the remaining sheave faces. Preferably the variable arcuate reference portions are chosen to apply to a particular belt group of market-related belts such as industrial belts; automotive belts; or truck belts.

The stick 18 is divided into a plurality of scales 26, 28, 30 or belt identification characters that correspond to belts of different cross-sections or categories. From each arcuate reference portion 22, 24, 26 an indicator may lead to a scale pointer 32, 34, 36 for directly identifying a particular belt. When it is desired to measure belt length in standard units such as inches or millimeters, only one scale is provided on the stick. However, it is preferred to provide a scale to correspond to each arcuate reference portion. Groups of characters are shown on the example stick where one character identifies a specific belt of nominal top width and length. For example, the characters may be a V-belt product number for a particular belt manufacturer. By directly identifying a V-belt replacement from the scale of the stick, the problem of looking up a belt identification from a reference table or book is avoided.

The most important feature of the invention is best illustrated when the stick is used. When a belt, shown in phantom, is to be measured, it is placed around the semi-sheave members and moderately tensioned by sliding the movable sheave member 12 along the stick. This divides the belt into two arcs of known length and two straight sections of determinable length. The cumulative length of the arcs and straight sections are determined by the scale.

An edge of the belt lies contiguous to the arcuate reference portions 22, 24, 26 of the sheave face. The belt width establishes a position where the belt nests in the V-groove 16. A belt having a larger top width (e.g. ⅞ in.) will nest radially outward in the V-groove whereas belts having a smaller top width (e.g. 11/16 in.) will nest radially inward in the V-groove. The reference portions are examined by sight or touch in gauging belt top width. A belt that nests radially outward of a reference portion is too wide and a belt that nests radially inward of a reference portion is too narrow. Belt top width is established when a belt rests both radially inward and outward of the same reference portion. A plurality of belts of slightly varying widths may nest within one reference portion.

In some instances, a belt will nest at both the large radius of one variable reference portion and at the small radius of the next larger reference portion. In such cases, it is desirable to gauge the belt as having the larger top width to insure adequate belt load/life capability.

After the belt top width is gauged by means of the variable reference, belt identification may be determined. If the scale is calibrated for length, belt length may be read. When a plurality of scales are used, it is desirable to have them arranged as a list of belt identification characters which individually identify a replacement belt. The pointer 32, 34, 36 leading from the appropriate reference portion directly identifies the appropriate replacement belt from the scale 26, 28, 30. Thus, a replacement belt is directly identified with reduced error because of the tolerance considerations of the variable reference portions.

ADDITIONAL SPECIES

The variable reference portions are described above as being generated by a constantly increasing radius. The increasing radius may be generated by small straight or stepped lines. However, the locus of points generated by such sheaves would generate generally a spiral. Accordingly, the term "increasing radius" is used to denote those geometric arrangements (i.e., straight lines rather than curves) that identify the variable reference portion.

The foregoing detailed description is made for purpose of illustration only and is not intended to limit the scope of the invention which is to be determined from the appended claims.

What is claimed is:

1. A gauge for identifying V-belts of various top widths and lengths comprising:
   a first generally semi-sheave member having a V-groove defined by two oppositely oriented faces;
   a stick fixedly attached near one end to said first member, the stick having its length identifying characters;
   a second generally semi-sheave member attached to said stick for reciprocal movement toward and away from the first semi-sheave member, the second semi-sheave member having a V-groove defined by two oppositely oriented faces, the first and second semi-sheave members arranged to have their V-grooves oppositely facing away from each other adapted for receiving a V-Belt and dividing it into two curved portions and two straight portions;

means for gauging the top width of a V-belt comprising at least one of said oppositely oriented faces with at least one variable arcuate outer peripheral portion defined by a generally constantly increasing face radius that effects generally a constantly increasing arcuate V-groove portion of increasing width juxtaposed thereto to define a variable gauging portion;

means in cooperation with the variable gauging portion for pointing to the belt identifying characters.

2. A gauge as set forth in claim 1 wherein the identifying characters include an array of symbols that designate a V-belt of predetermined top width and circumference.

3. A gauge as set forth in claim 1 wherein the oppositely oriented juxtaposed faces of a semi-sheave member have essentially the same arcuate contour.

4. A gauge as set forth in claim 1 wherein variable gauging portions are arcuately separated by at least one notch.

5. A gauge as set forth in claim 1 wherein variable gauging portions are arcuately separated.

6. In a gauge for identifying V-belts of various top widths and lengths of the type having two semi-sheave members mounted to a calibrated stick with one semi-sheave member reciprocally movable thereon, the semi-sheave members having oppositely facing away V-grooves defined by oppositely oriented faces of the semi-sheave members, the improvement comprising:

means for gauging the top width of a V-belt comprising at least one of said faces with at least one variable arcuate outer peripheral portion defined by a generally constantly increasing face radius that effects generally a constantly increasing arcuate V-groove portion juxtaposed thereto to define a variable gauging portion.

* * * * *